Feb. 7, 1961 H. F. OLSON ET AL 2,971,058

METHOD OF AND APPARATUS FOR SPEECH ANALYSIS AND PRINTER CONTROL MECHANISMS

Filed May 29, 1957 12 Sheets-Sheet 1

INVENTORS.
Harry F. Olson & Herbert Belar

BY Morris A. Rabkin

ATTORNEY.

INVENTORS.
Harry F. Olson &
Herbert Belar
BY Morris A. Rabkin
ATTORNEY.

Feb. 7, 1961 H. F. OLSON ET AL 2,971,058

METHOD OF AND APPARATUS FOR SPEECH ANALYSIS AND PRINTER CONTROL MECHANISMS

Filed May 29, 1957 12 Sheets-Sheet 3

INVENTORS.
Harry F. Olson &
Herbert Belar

BY Morris Rabkin

ATTORNEY.

INVENTORS.
Harry F. Olson &
Herbert Belar
BY Morris Rahtin
ATTORNEY.

INVENTORS.
Harry F. Olson &
Herbert Belar
BY Morris L. Ruben
ATTORNEY.

Feb. 7, 1961 H. F. OLSON ET AL 2,971,058

METHOD OF AND APPARATUS FOR SPEECH ANALYSIS AND PRINTER CONTROL MECHANISMS

Filed May 29, 1957 12 Sheets-Sheet 6

INVENTORS.
Harry F. Olson &
Herbert Belar

BY Morris Rabkin

ATTORNEY.

Feb. 7, 1961 H. F. OLSON ET AL 2,971,058

METHOD OF AND APPARATUS FOR SPEECH ANALYSIS AND PRINTER CONTROL MECHANISMS

Filed May 29, 1957 12 Sheets-Sheet 7

INVENTORS.
Harry F. Olson &
Herbert Belar
BY Morris B. Rabkin
ATTORNEY.

INVENTORS.
Harry F. Olson &
Herbert Belar
BY Morris [signature]
ATTORNEY.

Feb. 7, 1961 H. F. OLSON ET AL 2,971,058

METHOD OF AND APPARATUS FOR SPEECH ANALYSIS AND PRINTER CONTROL MECHANISMS

Filed May 29, 1957 12 Sheets-Sheet 9

INVENTORS.
Harry F. Olson &
Herbert Belar

BY Morris Rabkin
ATTORNEY

Feb. 7, 1961 H. F. OLSON ET AL 2,971,058

METHOD OF AND APPARATUS FOR SPEECH ANALYSIS AND PRINTER CONTROL MECHANISMS

Filed May 29, 1957 12 Sheets-Sheet 10

INVENTORS.
Harry F. Olson &
Herbert Belar
BY Morris A. Rabkin
ATTORNEY.

INVENTORS.
Harry F. Olson &
Herbert Belar
BY Morris A. Rabkin
ATTORNEY.

INVENTORS.
Harry F. Olson &
Herbert Belar
BY
[signature]
ATTORNEY.

United States Patent Office 2,971,058

Patented Feb. 7, 1961

2,971,058

METHOD OF AND APPARATUS FOR SPEECH ANALYSIS AND PRINTER CONTROL MECHANISMS

Harry F. Olson, Princeton, and Herbert Belar, Palmyra, N.J., assignors to Radio Corporation of America, a corporation of Delaware Filed May 29, 1957, Ser. No. 662,370

13 Claims. (Cl. 178—31)

The present invention relates to speech analysis and the operation of a recorder, such as a printer, under control of signals derived as a result of speech analysis, and more particularly, but not necessarily exclusively, to novel methods of an apparatus for analyzing speech sounds for the purpose of deriving control signals in a novel manner to control operation of a printer, for example.

In accordance with the present invention, sounds, such, for example as spoken syllables, are analyzed in a novel manner and the results of the analysis are identified by electrically operated means. This latter means performs selecting operations which provide signals for control purposes. The control signals may be used to control operation of a printing recorder, such, for example, as a typewriter. The methods of and means for carrying out sound analysis, disclosed herein, provides for analysis in steps of time which are not fixed, but vary in accordance with changes in the acoustic spectrum.

An important object of the present invention is to provide novel methods of and apparatus for analyzing sounds, such, for example, as spoken sounds for the purpose of deriving control signals.

Another object of the present invention is to provide novel methods of and apparatus for operating a recording printer under control of signals derived from the analysis of speech sounds.

A further object of the present invention is to provide novel methods of and apparatus for progressively analyzing a spoken sound in terms of frequency and amplitude for the duration of the sound.

A still further and closely related object is to provide a visual indication of the just mentioned analysis.

A still further object of the present invention is to provide a novel means for deriving control signals as a result of speech analysis.

A still further object of the present invention is to provide a novel arrangement for storing signals representing other signals initially obtained by progressive analysis of a spoken sound.

Other objects and advantages of the present invention will of course, become apparent and immediately suggest themselves to those skilled in the art to which the invention is directed from a reading of the following description in connection with the accompanying drawing in which.

The method of sound analysis described in the copending application, Serial No. 490,592, filed February 25, 1955 of the present inventors will be discussed before the illustrative embodiment of apparatus for employing signals resulting from the analysis is described. The amplitude of a typical vowel sound as a function of time shows that speech carries a tremendous amount of information. The vowel sound is I (ai). However, there is nothing immediately apparent from the characteristic of a vowel in this form that can be used to identify and differentiate this vowel sound from another vowel or for that matter other sounds, so that the sound can be used for deriving control signals to actuate a machine such, for example, as a speech operated printer. It was discovered that to obtain this objective, it is necessary to break down the time characteristic of a sound into the parameters that carry the phonetic information in speech.

Figure 1:
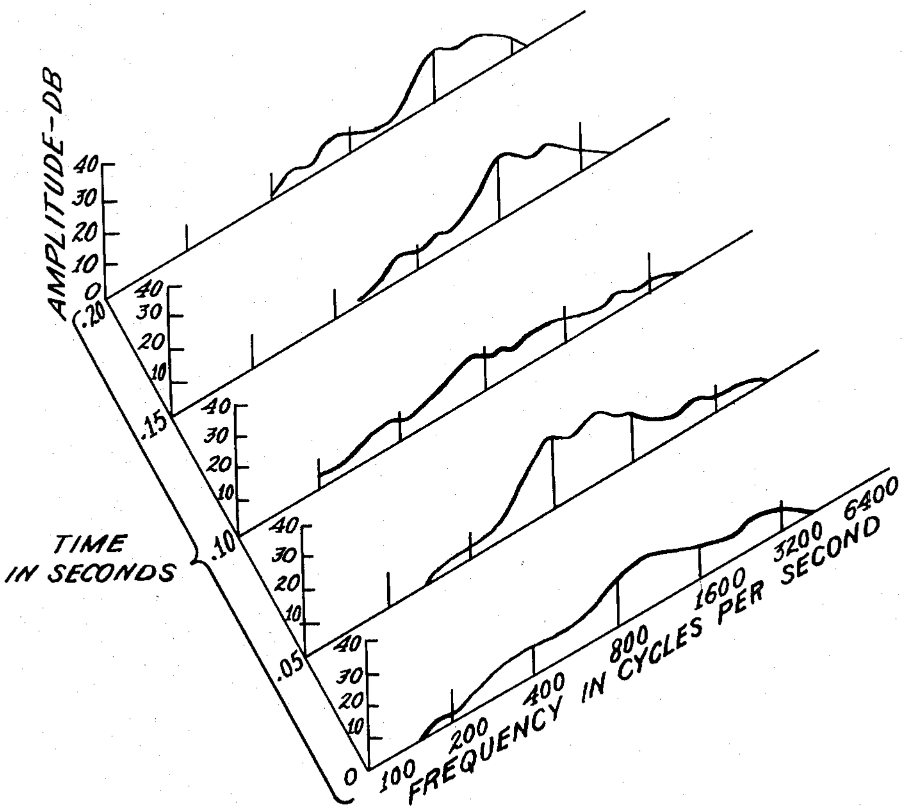
Fig. 1 is a graph showing the frequency, time and amplitude characteristics of a vowel sound.

The amplitude characteristic as a function of the time can be analyzed into response frequency characteristics at discrete frequency intervals as described in the copending application referred to above. Five response frequency characteristics of the vowel I at 0, .05, .1, .15 and .2 second are shown in Fig. 1. In this illustration the parameters are amplitude and frequency at discrete time intervals or steps. In accordance with the present invention, the steps of time are not fixed or predetermined, but are determined by changes in the acoustic spectrum of the sunch, such as a speech sound.

Figure 2:
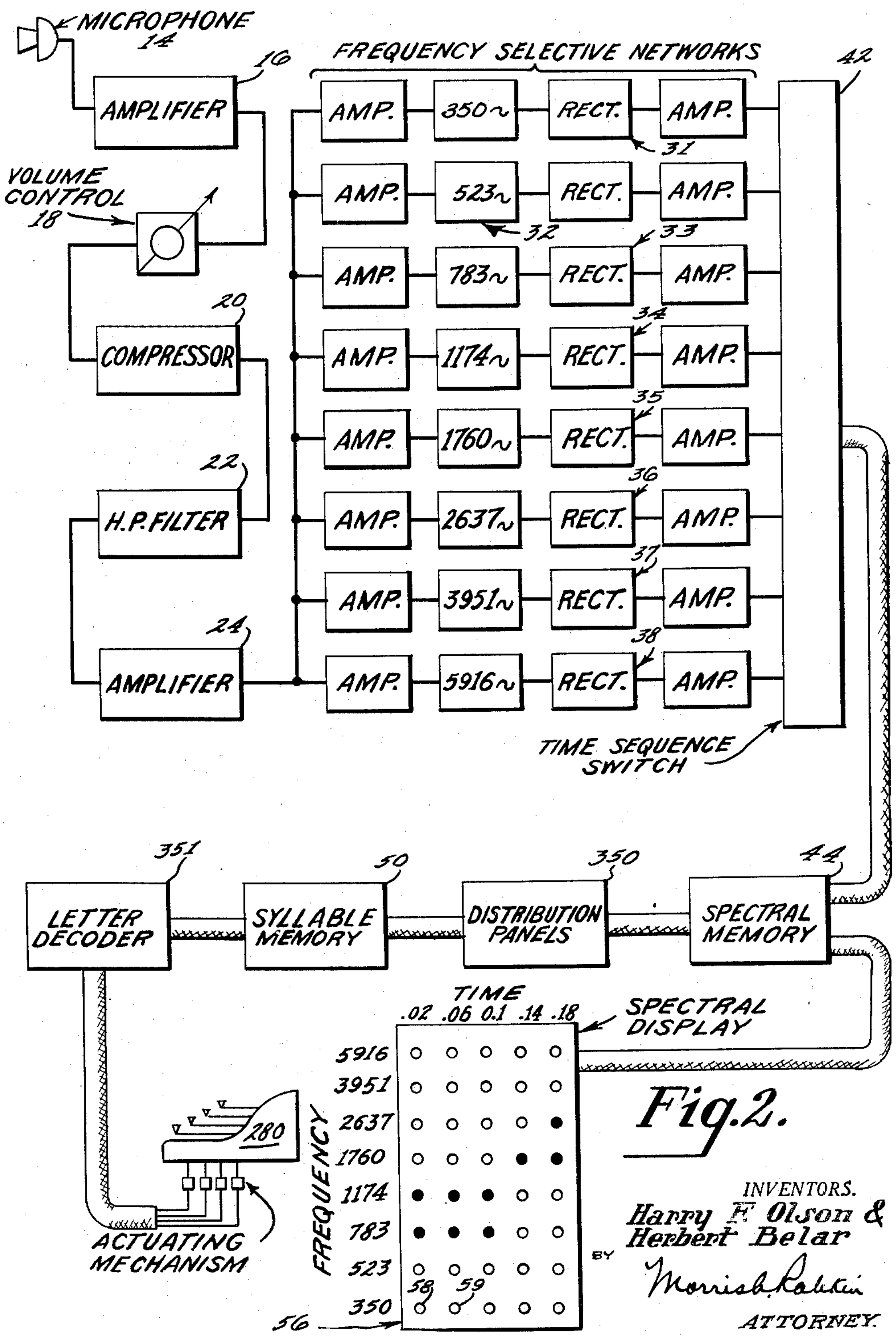
Fig. 2 is a schematic diagram showing a complete system in accordance with the invention for printing a record of spoken sounds.

If a definite upper amplitude limit is selected and sections are selected at successive, but varying, time intervals, the frequency-time-amplitude characteristic may be as shown on the spectral display portion of Fig. 2. This characteristic may be used as the basis for controlling operation of apparatus, such, for example as a typewriter.

Figure 6:
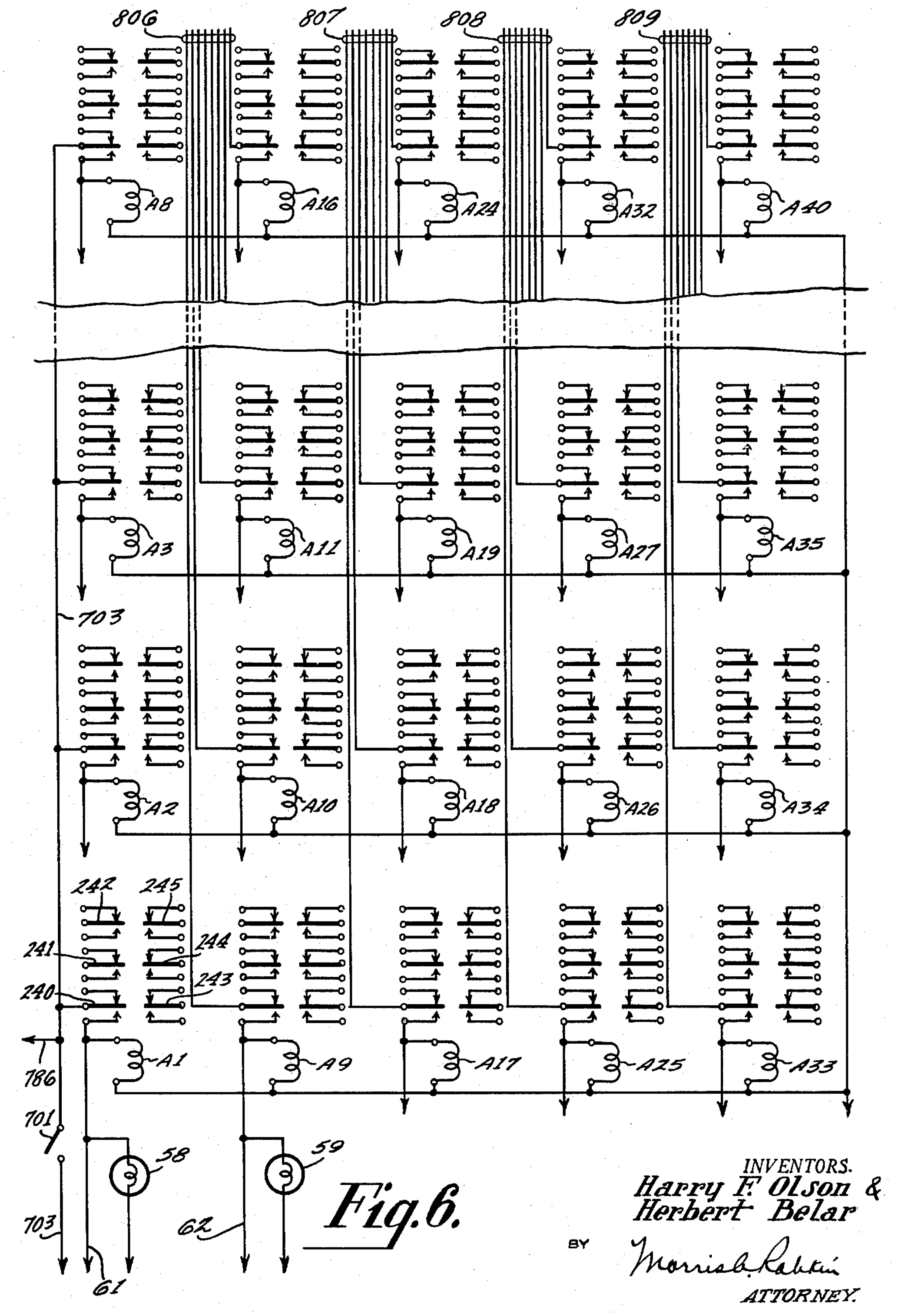
Fig. 6 is a schematic showing of the connections from the apparatus of Fig. 5 to a set of relays of the master control panel appearing in block form in Fig. 2.
Figure 7:
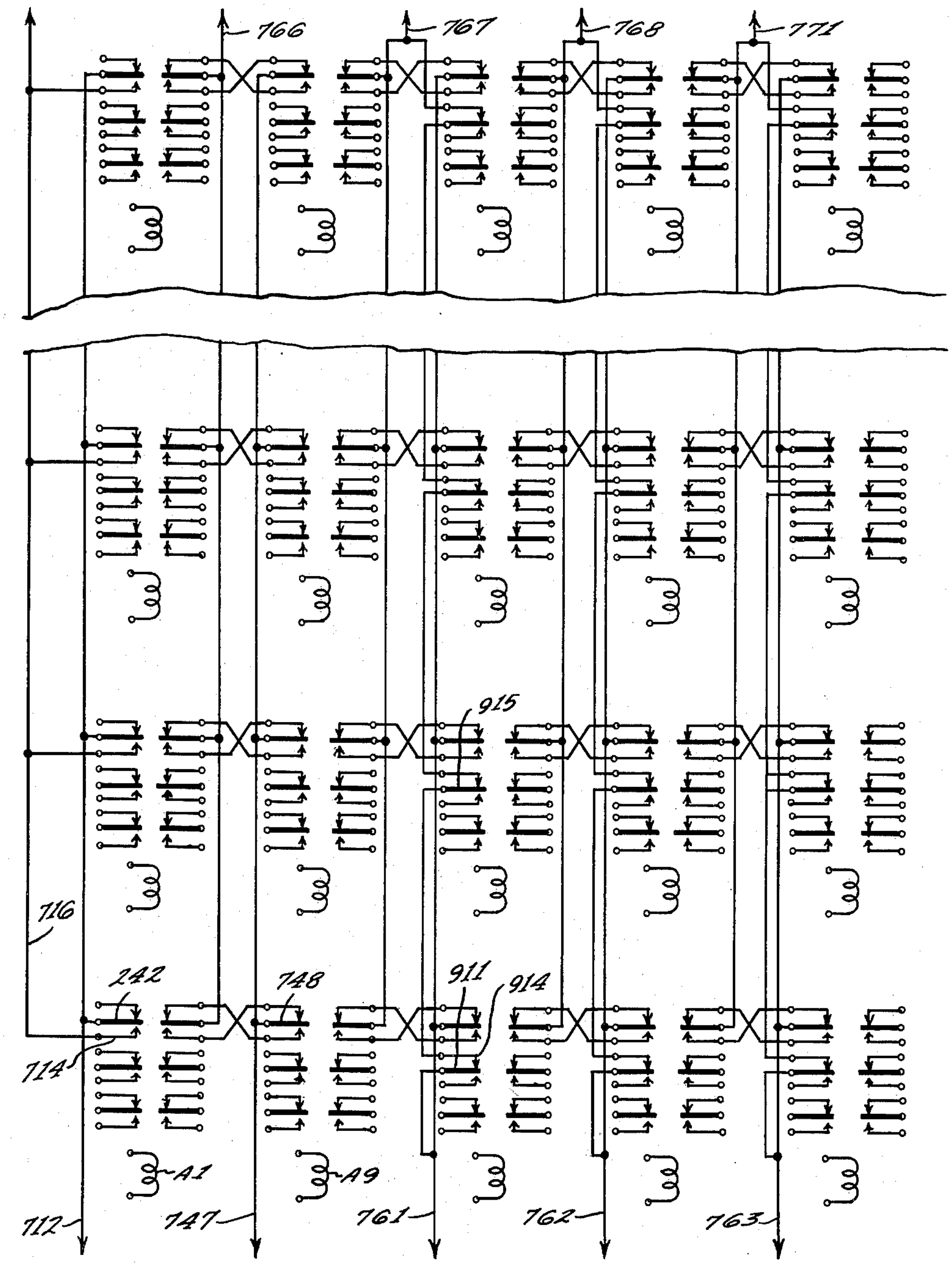
Fig. 7 is a schematic showing, similar to Fig. 6, of the set of relays and the connections for controlling sequencing of the apparatus of Fig. 5.
Figure 13:
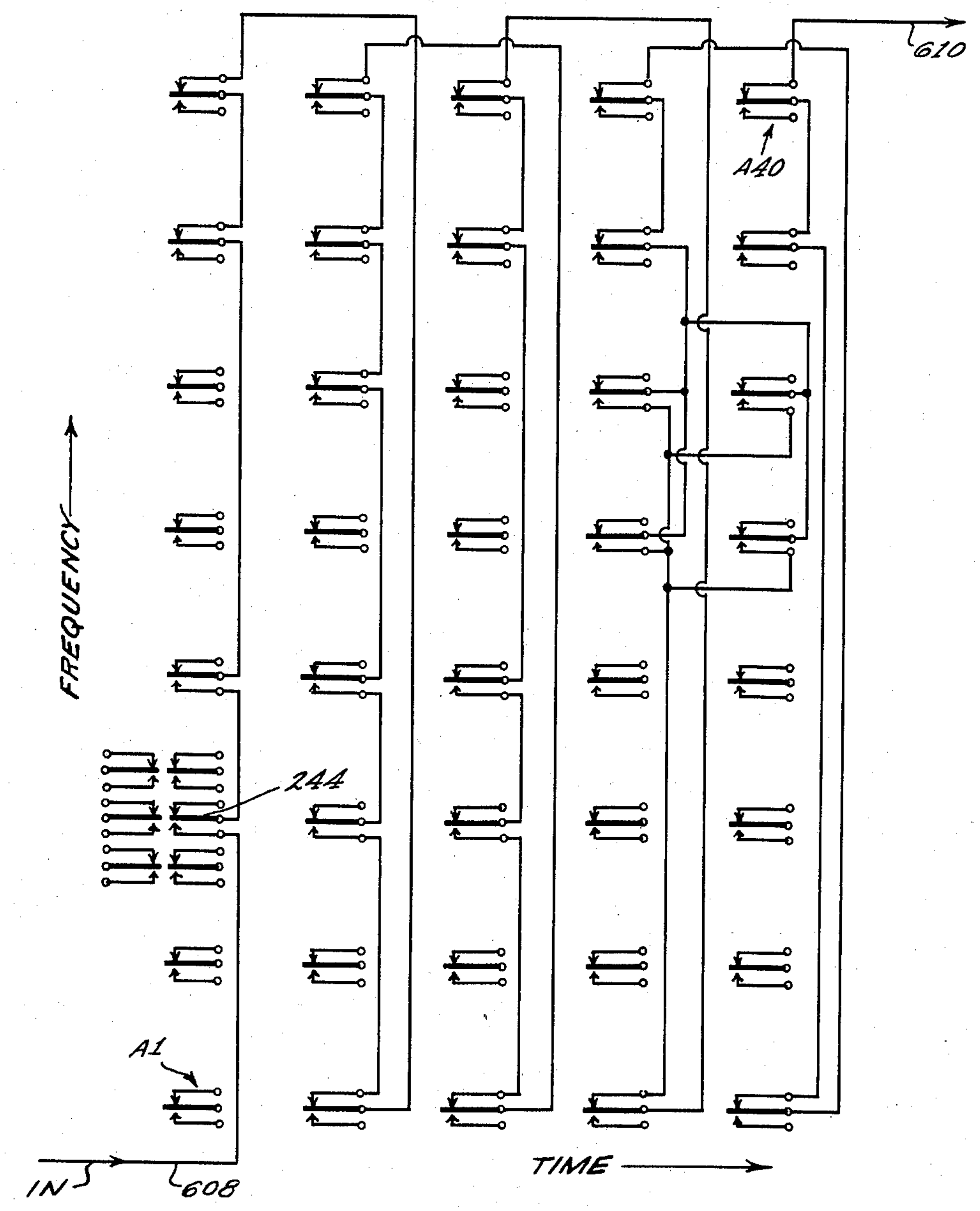
Fig. 13 shows examples of relay code connections for a spoken sound.

The elements of a system in accordance with this invention which will provide a visible display of the spectrum of sounds are shown in Fig. 2. The sound is picked up by a microphone 14 and converted into the corresponding electrical variations by a voltage amplifier 16. The voltage amplifier is followed by a gain control 18 which in turn is followed by a vacuum tube compressor-amplifier 20. The output of the compressor is filtered at 22 by a high pass filter and is fed to a power amplifier 24. The output of the power amplifier is fed to eight selective networks or channels designated generally by reference characters 31 to 38. The center frequency of each of the selective channels is indicated on Fig. 2. The outputs of the frequency selective networks are fed to a sound controlled sequence switch 42. The sequence switch 42 connects the output of the frequency selective networks to a set or group of relays. In the illustrative example shown more in detail by Fig. 6, forty relays are employed and are comprised in the master control panel forty. Figs. 7 and 13 also show the set of 44 relays but with other portions of their connections to avoid confusion. The relays are designated A1 to A40. For example, the output of the 350 cycle network is fed to the first relay until there is a change in the accoustic spectrum. The output of the 523 cycle network is fed to the second relay for the same time interval as determined by the spectrum change. Now, the sequence switch 42 moves to the second interval and connects the selective networks 350, 523 cycles, etc. to the ninth and tenth relays etc. This process is repeated for the remainder of the relays. The relays are or may be amplitude selective. That is, a relay will not be actuated unless there is sufficient current to close it. Thus, the sounds of sufficient amplitude will close the relay. After the relay closes, it holds until released. A spectral display 56 composed of forty lights, two of which, 58 and 59, appear in Fig. 6, is provided. These lamps are connected to the relays A1 and A9, respectively. The remaining thirty-eight lights are connected to the remaining relays in a similar manner. Relay 51 actuates the light 58 and the second relay actuates the second light, etc. If the vowel sound I (ai) is picked up by the microphone 14, the spectrum display for a certain value of the gain control will be as shown in Fig. 2 by the shaded circles representing the lights. This can be deduced from a consideration of Fig. 1. Another vowel sound will present a different display. As a matter of fact, the various fundamental sounds of speech will exhibit different spectrum displays.

To convert speech information in the form of frequency bands intervals determined by duration of spectral parts and amplitude levels to the corresponding printed or typed page requires memory and switch mechanisms as described hereinafter.

Figure 3:
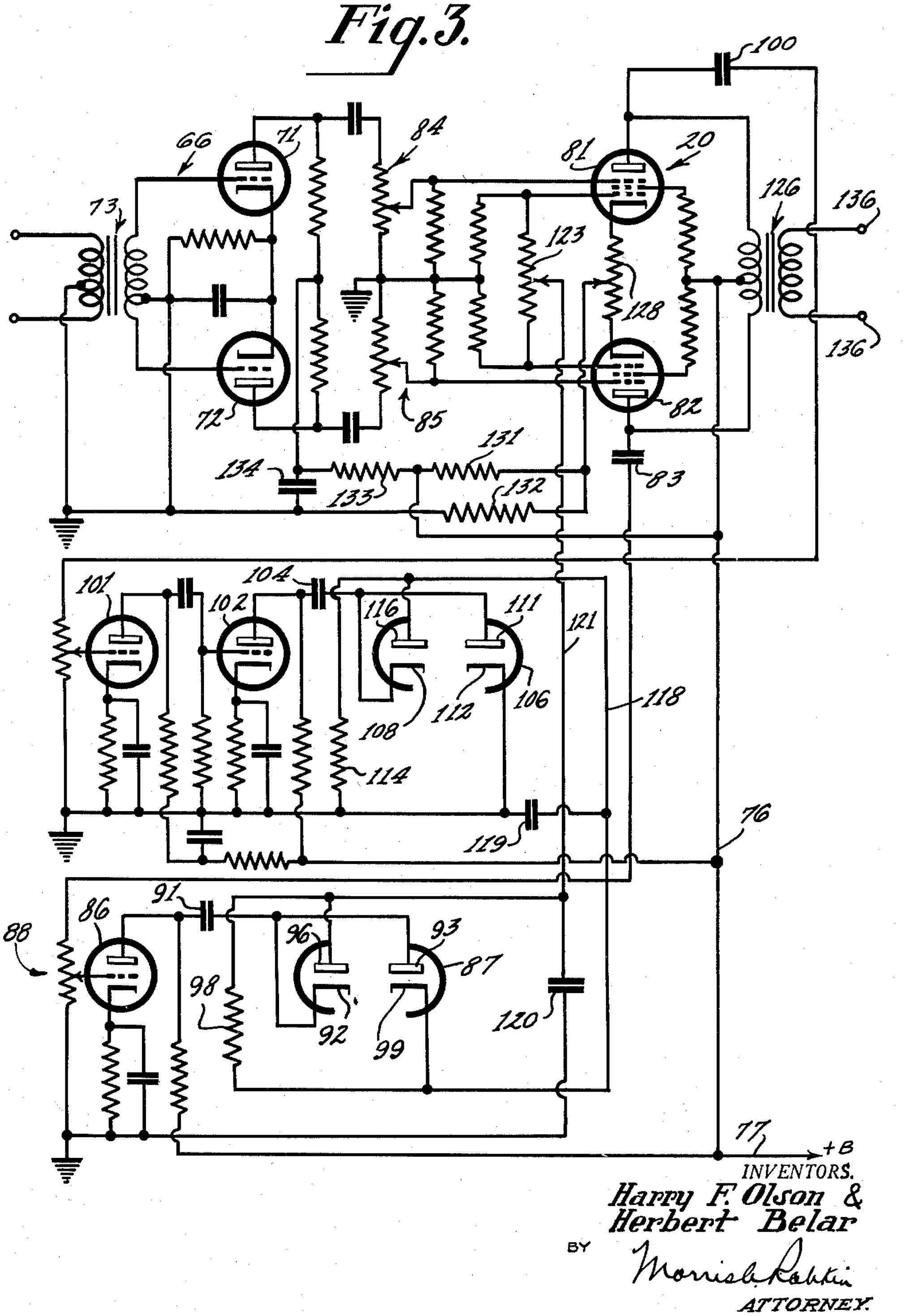
Fig. 3 is a schematic showing of the preamplifier and compressor amplifier appearing in block form in Fig. 2.

In the course of normal speech, as used in dictation, the amplitude level may vary over wide limits. Since analysis is a function of the amplitude level, some means must be provided to maintain a relatively constant output level over a wide range of input levels. This is accomplished by the previously mentioned volume compressor 20. An electronic volume compressor is a system which reduces the amplification of a vacuum tube amplifier when the signal being amplified is large and increases the amplification when the signal is small. A schematic diagram of the compressor 20 is shown in Fig. 3 of the drawing. It is preceded by a push-pull amplifier 66. The amplifier 66 is made up of two tubes 71 and 72 which may be a single type 12AU7 tube. Suitable biasing voltages are applied to this tube in known manner and the input is applied to the signal grids by way of an input transformer 73. Plate voltage is supplied by way of a conductor 76 connected as indicated at 77 to a suitable source (not shown) of positive voltage labelled +B. The controlled compressor amplifier 20 comprises tubes 81 and 82. These two tubes may take the form of a single 6BE6 tube. The speech input is applied to the No. 3 grids, for example, of the tubes 81 and 82 by way of a pair of balancing potentiometers 84 and 85 which serve as volume controls for each half of the push-pull stage.

The output of the tube 82 is fed by way of a capacitor 83 to a single stage amplifier 86 and a rectifier 87. The input to the amplifier 86 is controllable by a potentiometer 88. The rectifier 87 is made up of two diodes which may, for example, be the halves of a 6AL5 tube. The output of the amplifier 86 is coupled by way of a capacitor 91 to the cathode 92 of the first diode and the anode 93 of the second diode. The anode 96 is connected by way of the load resistor 98 to the cathode 99 of the second diode thereby completing the D.C. path.

The output from the tube 81 of the amplifier 20 is applied by way of a capacitor 100 to the first stage tube 101 of a two stage amplifier. The output from the second stage tube 102 of the two stage amplifier is applied by a coupling capacitor 104 to a rectifier 106. The connections of the rectifier 106 are similar to the connections of the rectifier 87. The output from the tube 102 is applied to the cathode 108 of the first diode of the rectifier and to the anode 111 of the second diode of the rectifier. The cathode 112 of the second diode is connected to a circuit reference point, in this instance ground, in the compressor amplifier arrangement of Fig. 3. A diode load resistor 114 is connected between the anode 116 of the first diode and the cathode 112 of the second diode to complete the D.C. load circuit of the diode 106. The negative end of the load resistor 114 at the anode 116 is connected by way of a conductor 118 to the cathode 99 of the second diode of the rectifier 87. A filter capacitor 119 is connected between the conductor 118 and ground. A second filter capacitor 120 is connected between the anode 96 and ground. The anode 96 of the first diode of the rectifier 87 is connected by means of a conductor 121 to the No. 1 grids of the tubes 81 and 82 which in turn are connected to the ends of the resistor of a potentiometer 123. By the connection shown, the outputs of the rectifiers 87 and 106 are added and applied to the grids of the tubes 81 and 82 comprising the push-pull output stage 20. An output transformer 126 provides an output connection from the stage 20. The cathodes of the tubes 81 and 82 are connected to the ends of the resistor of a potentiometer 128. The sliding contact of this potentiometer is connected to a circuit reference point which is positive with respect to ground. The latter connection is provided by voltage divider resistors 131 and 132. A series resistor 133 and a decoupling capacitor 134 provide the positive supply for the anodes of the tubes 71 and 72. The potentiometer 128 provides a balancing control at high gain. The potentiometer 123 provides a balancing control at low gain. The former adjusts the cathode voltages and the latter the bias voltages of the number one grids.

The tubes in the output stage are of the variable transconductance type which means that the amplification of the tube will vary as the voltage applied to the first grid is varied. The output of the rectifiers 87 and 106 is a function of the input to the amplifier. The amplification of the amplifier is an inverse function of the bias applied to the first grids of the output stage 20. Thus, it will be seen that as the input to the amplifier increases the negative bias applied to the first grids of the output stage will be increased which in turn will decrease the amplification factor the amplifier. The net result is a gradual reduction in gain with increase of the input.

Figure 4:
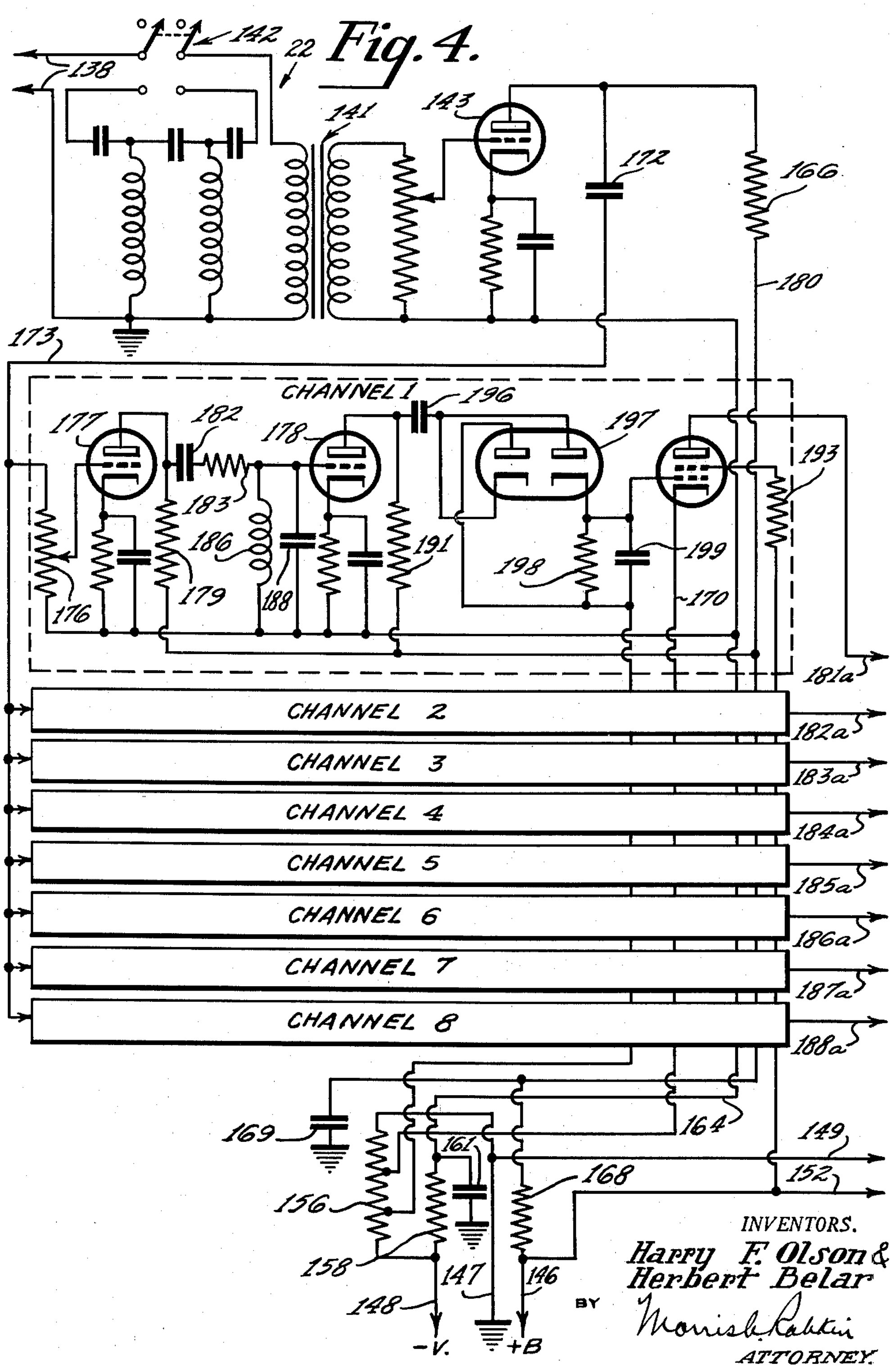
Fig. 4 is a schematic diagram of the frequency selective amplifiers and the actuating amplifier appearing in block form in Fig. 2.

Following the compressor amplifier is the frequency analyzing system which is indicated by reference characters 31 to 38 in Fig. 2 of the drawing, and is shown more in detail by Fig. 4 of the drawing. The output of the transformer 126 in Fig. 3 appears at terminals 136 which are to be connected to input terminals 138 of Fig. 4. The input to the frequency analyzing system passes through the high pass filter 22 (Figs. 2 and 4) to the primary of an interstage transformer 141. Since there is very little information in speech below 200 cycles this portion of the range can be eliminated without any appreciable loss. In view of this fact, the high pass filter 22 is used to reduce the deleterious effects of ambient noises which occur in the low frequency range. The filter 22 may be of any known type with the lower frequency cut off at about 200 cycles. A double-pole, double-throw switch 142 is provided so that the filter 22 may be cut out of the circuit when desired. The secondary of the transformer 141 feeds the signal onto the the grid of an amplifier tube 143.

The power supply (not shown) for the apparatus of Fig. 4 may be of any known or desired type and is to be connected to terminals 146, 147 and 148. The positive terminal of the power supply is to be connected to the terminal 146 labelled +B. The terminal 147 is a voltage reference point of the system and it may, if desired, be a ground connection. The lead from the terminal 147 is extended to the apparatus of Figs. 5, 6 and 7 by way of a conductor 149. The connection to the positive supply terminal 146 is also extended by way of a conductor 152. The lead from the negative terminal 148 of the power supply is connected to ground through a voltage dividing resistor 156. A dropping resistor 158 and a decoupling capacitor 161 provide a cathode lead connection for the tube 143 by way of a conductor 164. The anode of the tube 143 is connected by way of a load resistor 166 and a dropping resistor and decoupling condenser combination 168 and 169 to the positive supply terminal 146.

The output of the tube 143 is applied by way of a coupling capacitor 172 to a conductor 173. The conductor 173 serves as an input lead for the frequency separation channels 31 to 38 which are shown schematically in Fig. 2 of the drawing. One of these channels, namely the channel 31, is shown in more detail on Fig. 4 of the drawing. The resistor of an input potentiometer 176 is connected between the conductor 173 and the conductor 164. The sliding contact of the potentiometer is connected to the grid of the first stage tube 177. The interstage coupling means between the tube 177 and the second stage tube 178 includes a bandpass filter means now to be described. The anode of the tube 177 is connected through a load resistor 179 to the positive power supply through the dropping resistor 168. This latter connection is effected by way of a conductor 180 to which the previously mentioned load resistor 166 for the tube 143 is connected. The anode of the tube 177 is connected to the grid of the tube 178 by way of a capacitor 182 and a resistor 183.

The bandpass filter 37 is made up of the inductance 186 and a capacitor 188. In the illustrative example, the inductance has a value of .08H and the capacitor 188 has a value of 2.6 mf. This peaks the bandpass response at substantially 350 cycles. The remaining interstage coupler filters for the channels 32 to 38, inclusive, are selected in accordance with known principles to obtain center frequency responses as indicated on Fig. 2 of the drawing.

The interstage coupler for the ninth channel designated by reference character 39 includes only the usual gril resistor rather than the combination of inductance and capacity present in the other channels. The channel 39, therefore, has a relatively flat response and passes the output of the high pass filter 22 substantially without attenuation.

The anode of the tube 178 is connected by way of a load resistor 191 to the conductor 180. The grids and cathodes of the tubes 177 and 178 are returned to the conductor 164. The output of the tube 178 is connected by way of a coupling condenser 196 to the cathode and the anode, respectively, of a pair of diodes in a rectifier tube 197. The latter may, for example, be a 6AL5 type tube. The anode of one diode and the cathode of the other diode is connected to a rectifier load resistor 198. The load resistor 198 is shunted by a filter capacitor 199. The double diode connection provides a direct current path through the load resistor 198. The negative end of the diode load resistor is connected to a conductor 200 which is in turn connected to a tap on the voltage divider resistor 156. The positive end of the load resistor 198 is direct current coupled to the grid of a direct current amplifier tube 150. The cathode of the tube 150 is returned by way of a conductor 170 to another tap on the voltage divider resistor 156.

The anode circuit of the output tube 150 is completed through circuits of the apparatus shown on Fig. 5 of the drawing and to be later described. For this purpose the anode of the tube 150 is connected to the first terminal **181*a* of a series of terminals 181*a* to 188*a*. These terminals 181*a* to 188*a* may be combined in the socket of a connector along with the terminals of the conductors 149 and 152. On Fig. 5, the terminals 181*b* to 188*b* are to be connected to the termnials 181*a* to 188*a***, respectively, of Fig. 4.

The screen grid of the tube 150 is connected by way of a dropping resistor 193 to the positive terminal 146 of the power supply. The amplifiers and rectifiers of the channels 32 through 38 are connected to the power supply terminals by way of the conductors 200, 170, 164 and 180 in the manner described for channel 31 which is shown in detail in Fig. 4 of the drawing. The screens of the output tubes are similarly connected.

Figure 5:
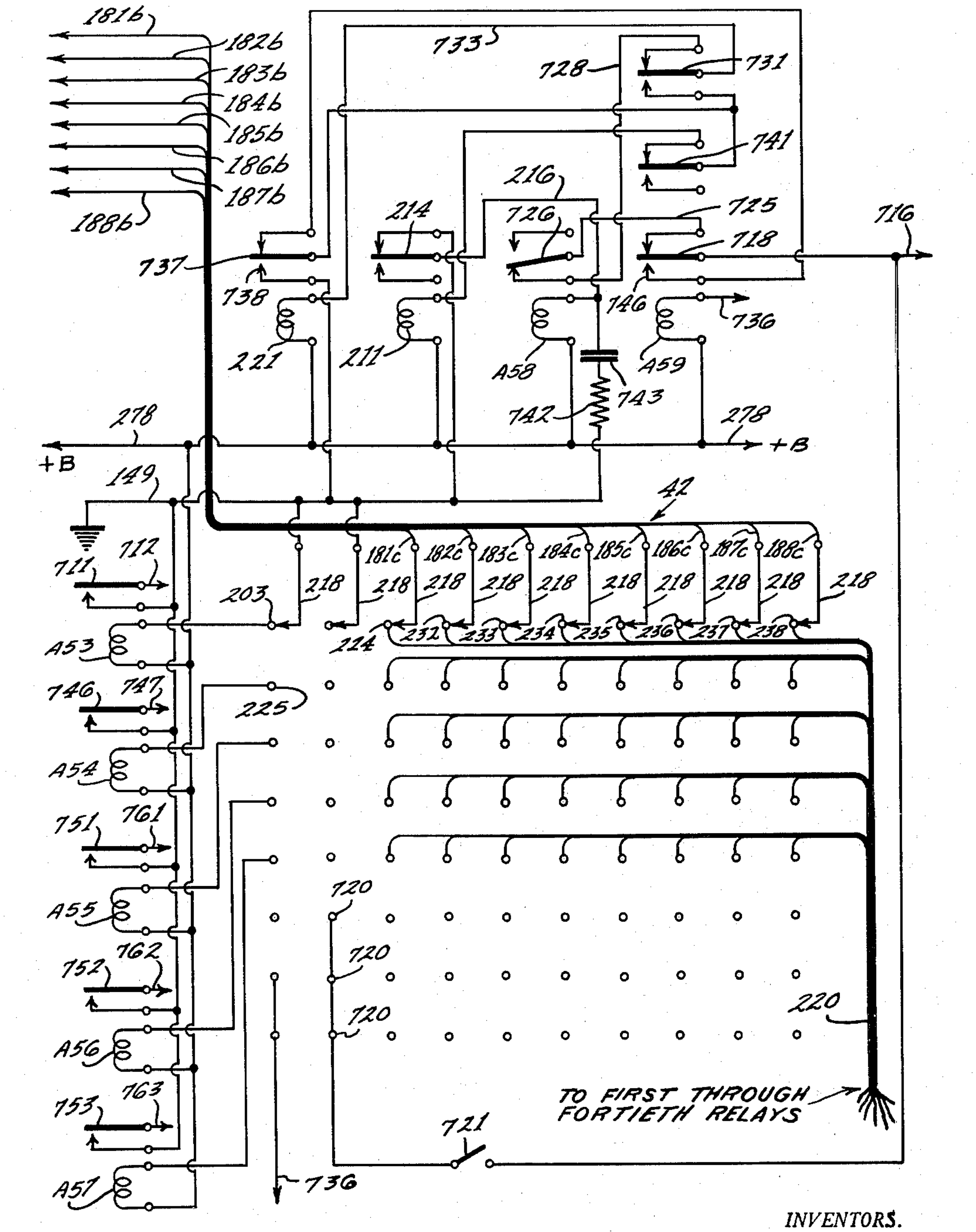
Fig. 5 is a schematic showing of apparatus capable of operating in accordance with the invention for analyzing sounds.

Fig. 5 of the drawing shows the sequencing switch and master decoder for the speech input to the microphone 14. The conductors 149 and 152 appear again at the left hand side of Fig. 5 of the drawing. A relay 211 serves to generate pulses which control the relay 221. The latter serves as a "stepped" relay for the sound controlled sequence switch 42. The tongue 214 of the relay 211 is connected to a conductor 216, the purpose of which will hereinafter be described.

The time sequence switch 42, which appears diagrammatically in Fig. 2 of the drawing, is shown in schematic detail in Fig. 5. This switch is a rotary switch of the stepper type having ten levels. Eight contact positions for the wipers 218 of this switch are indicated schematically in Fig. 5. The connections **181*b* to 188*b* are connected, respectively, to eight wiper arms 218 of the switch, as indicated by reference characters 181*c* to 188*c*. The stationary contacts of the eight positions of the switch 42, traversed by the wiper arms connected to the terminals 181*c* to 188*c*, are connected, by the schematically shown cabled connection 220, to the set of relays A10 to A40 as indicated in Fig. 6 of the drawing. One of these connections, shown as the conductor 61, will serve as an example of this connection to the relay coils. Stationary contact 224 of the switch 42 is connected to the operating coil of the relay A1 by way of the conductor 61, mentioned above. Stationary contacts 232 to 238 are connected to the second to the eighth relays, respectively. The lamp 58 is also connected to the conductor 61. A similar connection 62 is also shown for the relays A9. The lamps shown are the lamps of the spectral display 56** associated with each particular relay.

The rotary switch 42 may, for example, have a double set of stationary contacts (not shown) and a corresponding set of projecting wipers 218 so that wiper scanning operation will be repeated twice for each revolution of the wiper arms. A rotary switch suitable for the purpose is represented by the Automatic Electric Company Type 45 Stepping Switch.

A series of five relays, designated A53 to A57, have one of the terminals of their relay coils connected to the conductor 152. The remaining terminal of the relay A53 is connected to the contact 203 in the first level of the rotary switch 42. The coils of the remaining relays, A54 to A57, are connected, respectively, to the successive contacts in the first level of the switch 54. The wiper arm 218 for this level is connected to the conductor 149. In the "home" position of the rotary switch 42 the relay A53 is energized. As the rotary switch progresses in its operation, the relays A54 to A57 are energized successively.

The relay A1 (Fig. 6) is provided with a set of six armatures or contact tongues 240 to 245. Each tongue engages a back contact when the relay is deenergized and engages a front contact when the relay is energized. The front and back contacts, engaged by the tongue 244, as indicated in Fig. 13 of the drawing by way of example, serve to provide a relay code for a selected sound, character, or for a device which can exercise a control function. The tongues of all of the relays A1 to A40 are designated by the reference characters 240 to 245 for the sake of convenience and the tongue or tongues will be identified by association with a particular relay in the description which is to follow.

Figure 9:
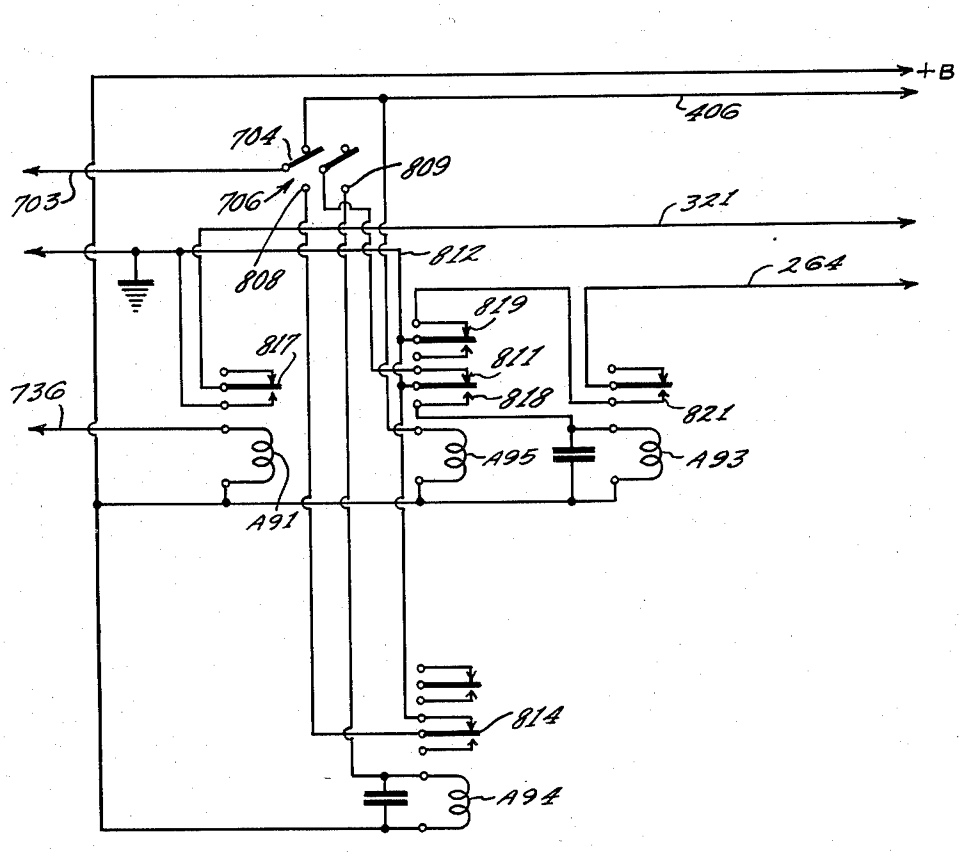
Fig. 9 is a schematic showing of connections between the master control panel and the decoding apparatus.
Figure 11:
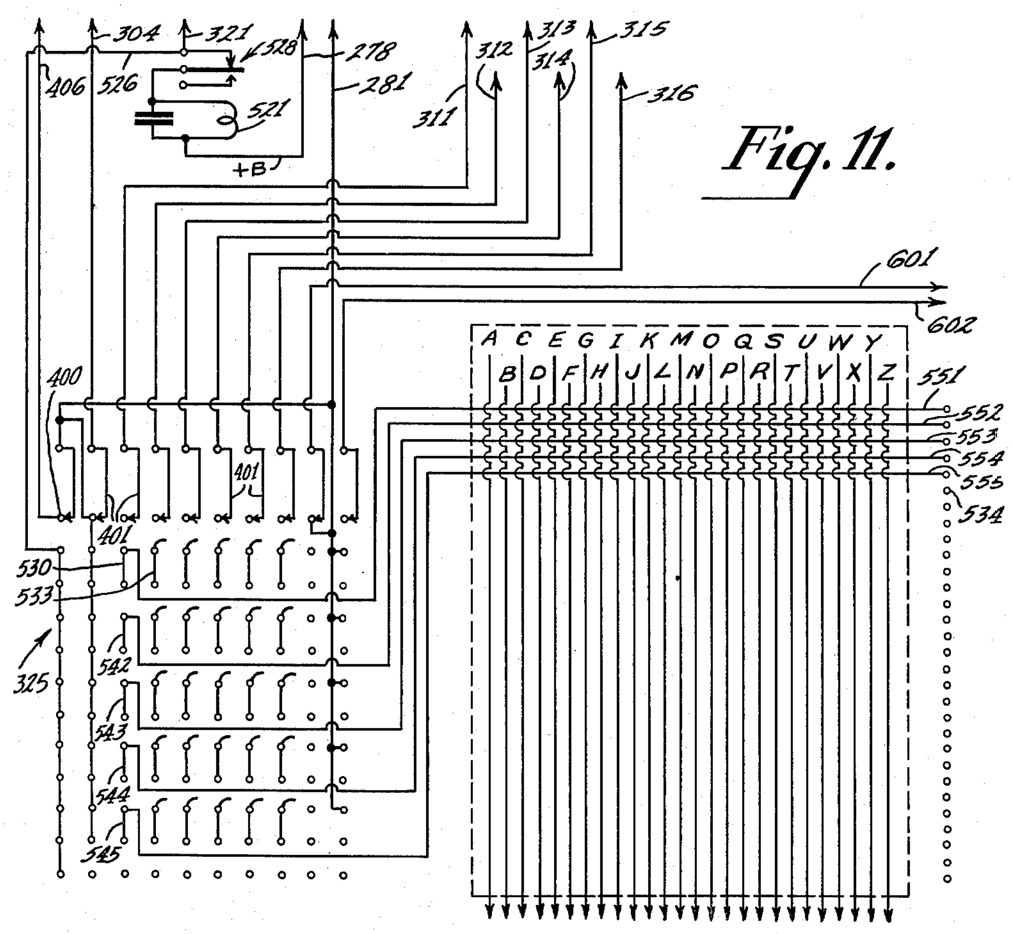
Fig. 11 is a schematic diagram of the letter memory of Fig. 1 which is in the form of a master letter decode switch.

The relay A1, if energized as hereinafter explained, will be locked by engagement of the tongue 240 with the corresponding front contact. The tongue 240 is connected by way of a switch 701 in a conductor 703 to one of the movable contacts 704 of a two position double-pole switch 706 (Fig. 9). One stationary contact of the switch 706, engageable by the movable contact 704, is connected to the first stationary contact 400 of the first level of a rotary switch 325 (Fig. 11). The circuit just described, with the switch 706 in the position shown, serves to lock the relay A1 after it is energized, as explained hereinafter. The conductor 703 also extends to the relays A2 to A8.

The previously mentioned relay A53 (Fig. 5) is provided with an armature or tongue 711 which is connected by way of a conductor 712 to the tongue 242 (Fig. 7) of the relay A1. The conductor 712 is also connected to the corresponding tongues of relays A1 to A8. The corresponding front contact 714 of the relay A1 is connected to a conductor 716 which is connected to the tongue 718 of a relay A59. Conductor 716 is also connected to the corresponding front contacts 714 of the relays A2 to A8. This forms eight parallel switches, any one of which being closed, closes the circuit from conductor 712 to conductor 716. The purpose is to advance the stepper 42 shown in Fig. 5. Thus no matter what the nature of the sound spectrum for the first time interval is, the system operates. The last three contacts 720 of the second level of the rotary switch 42 are connected through a switch 721 to the conductor 716.

Considering the apparatus thus far described, when sound impinges on the microphone 14 (Fig. 2) the amplifiers in the several channels 31 to 38 will transmit a signal depending upon the formant of the sound, for example a syllable which is spoken into the microphone 14. It will be assumed initially that the sound spectrum of the syllable contains a frequency which will be transmitted by the channel 31 so as to appear as a signal on the wiper 218 of the third level of the rotary switch 42. The stationary contact 224 of the rotary switch 42 transmits the signal to the coil of the relay A1 (Fig. 6). This relay is energized and is locked over the circuit previously traced from the tongue 240 via the conductor 703 to the contact 400 of the rotary switch 325 in Fig. 11. Referring to Fig. 7 of the drawing, the relay tongue 242 engages the corresponding stationary contact 714. Ground is then applied via the conductor 716 from the relay tongue 711 to the previously mentioned contact tongue 718 of the relay A59, through a conductor 725, to the tongue 726 of a relay A58, a conductor 728, one of the tongues 731 of the relay A59, and a conductor 733 to the operating coil of the relay 221. This relay serves as the stepper for the rotary switch 42 which is thus energized. Energizing the stepper causes ground to be connected through front contact 738 to tongue 737 and again through tongue 741 and corresponding front contact to the coil of relay 211, energizing it. Energizing relay 211 causes disconnection of the relay coil A58 by opening connections from conductor 216 to ground. This in turn opens the stepper coil circuit and limits the stepper operation to a single step. The speed of this operation is controlled by the value of capacitor 743. When the stepper advances one step, the relay A53 is deenergized which removes ground from the conductor 716 (Fig. 5). Relay A54 is then energized from the next succeeding contact in the first level of the rotary switch 42.

The seventh and eighth contacts in the first level of the rotary switch 42 are connected to a conductor 736 which is connected to the operating coil of the relay A59. When the relay A59 is energized the stepper relay 221 pulses automatically and at a greater speed than when operation of the rotary switch 42 is under control of sounds from the microphone 14. When the stepper relay 221 is energized, as pointed out previously, by way of the conductor 716 in response to operation of any one of the relays A1 to A8 (Fig. 7) its armature or tongue 737 is brought into engagement with the front contact 738. Engagement of the tongue 737 with the front contact 738 applies ground to the operating coil of the pulser relay 211 by way of the tongue 741 of the relay A59 which is deenergized at this time. Energization of the relay 211 causes its tongue 214 to remove ground from the coil of the relay A58. This breaks the previously traced circuit established at its tongue 726. A resistor 742 and capacitor 743, connected in series across the operating coil of the relay A58, provides for a delayed or slow-release characteristic of the relay A58.

As previously stated, when the rotary switch reaches its seventh step, ground is applied to the conductor 736 to energize the relay A59 and thereby to cause more rapid and continuous pulsing of the rotary switch 42. This is accomplished by applying ground via the switch 721 to the tongue 718 of the relay A59 and its back contact 746 which results in energization of the stepper relay coil 221. The connection through the tongue 726, which was previously employed in the stepping process, is interrupted at the tongue 718 of the relay A59. The rotary switch may be arrested at step number six by opening the switch 721 so that ground is not applied to the conductor 716 by the wiper 218 in the second level of the rotary switch.

With the wipers 218 of the rotary switch 42 in the second position, the relay A54 is energized from the contact 225. The tongue 746 of the relay A54 applies ground by way of a conductor 747 to the contact tongue 748 of the relay A9. This connection is similarly made for relays A10 to A16. The tongues 751 to 753 of relays A55 to A57, respectively, are connected in a similar manner to the conductors 761, 762 and 763 when these relays are energized in turn.

The circuit comprised by the wiring between relay contacts and conductors 766 and 747 in the case of column two, relays A9 to A16, is a coincidence detecting circuit. If relays of the same row are in the same condition the circuit from 747 to 766 is not completed. But if any relay in the same row is different, then connection from 747 to 766 is made and the stepper is caused to advance. Thus in position two and in succeeding positions the spectrum in that position is compared with that set by the previous position and the stepper is made to pause as long as there is no change.

The connection of 747 to conductor 766 operates the stepper switch 42 in the following manner.

Figure 8:
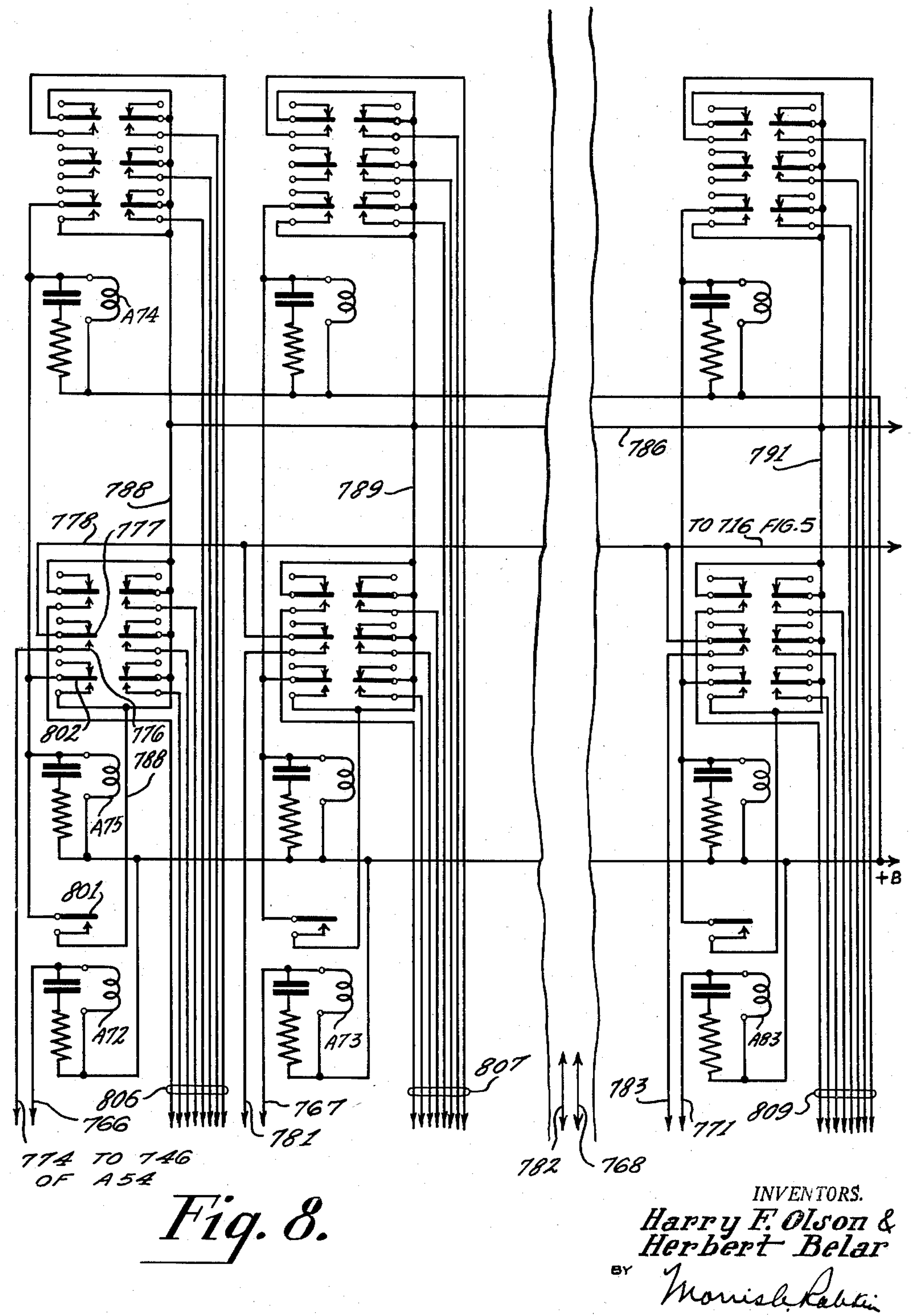
Fig. 8 is a schematic showing of another set of relays of the master control panel having their contacts connected to certain of the contacts of the first set of relays.

A conductor 766 (Fig. 7) is connected to the operating coil of a relay A72 (Fig. 8). A conductor 767 connects to the coil of a relay A73. A conductor 768 is employed for connection to the coil of a relay in a manner similar to the conductor 767. As illustrated on Fig. 8, the showing of four relays serving a function similar to that of the relay A73 and the relays thereabove on Fig. 8 have been omitted for the sake of convenience of description. A conductor 771 is connected to the operating coil of a relay A83. A conductor 774 (Fig. 8) is connected to the stationary contact 776 engageable by the tongue 777 of a relay A75. The relay tongue 777 is connected by way of a conductor 778 to the advance bus for the rotary switch 42. Referring to Fig. 5 of the drawing, this connection is designated 716.

The conductor 774 is connected to the tongue 746 of the relay A54 (Fig. 5). A conductor 781 (Fig. 8) is connected to the relay tongue 751 of the relay A55. A conductor 782 is indicated on Fig. 8 of the drawing and is connected to the relay tongue 752 of the relay A56. A conductor 783 is connected to the relay tongue 763 of the relay A57.

A conductor 786 (Fig. 8) is connected as indicated on Fig. 6 to the conductor 703 ahead of the switch 701. The conductor 786 is connected to branch conductors 788, 789 and 791. Also, branch conductors are provided for connection to the relays which have been omitted from the showing of Fig. 8 for reasons stated in the foregoing. The branch conductor 788 is connected to ground via the conductor 786, the conductor 703, the switch 701, the relay 706, to the first contact 400 (Fig. 11) of the stepper 325 in its homing position. The branch conductor 788, when the relay A72 is energized, will energize the relay A75 by way of the tongue 801 and the front contact of the relay A72. The relay A72 is controlled by the conductor 766. When the relay A75 is energized it is locked via its tongue 802 and front contact to the branch conductor 788. Relay A74 operates in a manner similar to the relay A75. The branch conductors 789 and 791 serve a function similar to that of the branch conductor 788. The relay A72 serves as a master relay to operate the relays A74 and A75. The relays A74 and A75 could be combined in one relay if desired. The relay A72 serves a timing function and also serves as an isolating relay isolating the locking circuits. It also insures that the spectrum respresented by the position of the corresponding relays is the same spectrum which caused operation of the stepper.

Referring to Fig. 6, a set 806 of eight conductors is connected as indicated on Fig. 8 to the relays A75 and A74. Similar sets of connections 807, 808 and 809 are also indicated in Figs. 6 and 8 except that the set of conductors 808 is to be connected to the two relays omitted from the showing of Fig. 8 for the sake of convenience of disclosure as pointed out above. These sets of eight conductors go to the front contacts of the relays of Fig. 8 and serve a locking function through the conductor 786.

Referring again to Fig. 7, when the stepper switch 42 is in position three, conductors 761 and 767 serve a similar purpose to the corresponding conductors 747 and 766 of position two, with the notable difference as follows: Conductor 761 is connected to tongue 911 of relay A17. The back contact 914 of the same relay is in turn connected to the tongue 915 of the relay above it, and so forth, for the entire column connecting finally to conductor 767. It can be seen that connection from 761 to 767 is made, not only when the spectrum of column three differs from the spectrum displayed by column two, but also if there is no spectrum. This is done to avoid locking the system in mid-operation in case the spectrum in column two is zero and all subsequent spectra also zero and therefore the same. The same provisions are made for steps four and five.

To recapitulate, the stepper is in position one. Any spectrum which energizes any channel advances it to the second step and it will remain there until a change takes place. Any change large enough to change the display advances the stepper to steps three where it rests again until there is a change. If the sound has decreased and the spectrum display is zero it will step and continue stepping completing a cycle.

The previously mentioned switch 706 is Fig. 9 of the drawing, when in position to engage stationary contacts 808 and 809, introduces a time delay in forwarding information from the contact 400 in Fig. 11 of the drawing. When the switch 325 of Fig. 11 is not in its homing position, ground is not applied to conductor 406. A relay A95 is deenergized at this time. The operating coil of this relay is connected to the lead marked +B and the conductor 406. A relay A94 has its operating coil connected to the +B lead and through the switch 706 to the back contact 811. The tongue engageable by this back contact is connected to the ground lead 812. When the switch 325 arrives at its homing position following a printing operation, ground is applied to the conductor 406 and the relay A95 is energized causing deenergization of the relay A94. At this time ground is applied to the conductor 703 by way of the switch contact 808 through the tongue 814 and its corresponding back contact of the relay A94. A time delay is thus introduced in the forwarding of homing information from the switch 325.

Figure 12:
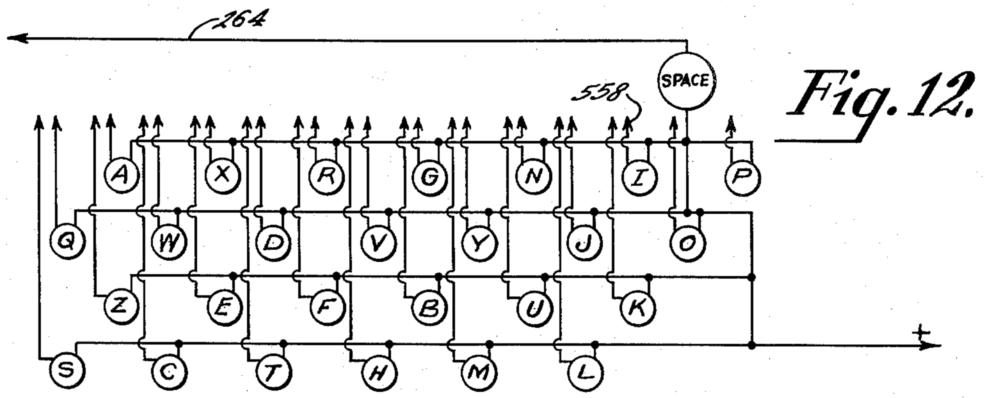
Fig. 12 is a schematic showing of the connections to the operating solenoids provided in a typewriter.

The operating coil of a relay A91 is connected by way of a continuation of the conductor 736 as shown in Fig. 5 of the drawing to the first level of the rotary switch 42. The tongue 817 forwards ground when the relay is energized through a conductor 321 to the mechanically controlled contacts 528 (Fig. 11) associated with the operating coil 521 of the stepper switch 325. The relay A91 serves as an isolating relay. A relay A93 is operated from the relay A95 by way of a front contact 818 when the relay A95 is energized. The relay A93, when the relay A95 is deenergized, applies ground by way of a back contact 819 and a front contact 821 of the relay A93 to a conductor 264. The conductor 264 (Fig. 12) connects to a solenoid 266. This solenoid 266 is a "space bar" operator for the typewriter mechanism.

It will be seen that as the wiper arms 218 progress over the stationary contacts in the rotary switch 42, various ones of the relays will be energized. In the assumed example for I and with an assumed predetermined coding, the third, fourth, eleventh, twelfth, nineteenth and twentieth relays must be energized. One of the thirtieth, twenty-ninth, thirty-seventh or thirty-eighth relay must be energized. The seventh, eighth, ninth, fourteenth, fifteenth, sixteenth, seventeenth, twenty-third, twenty-fourth, twenty-fifth, thirty-first, thirty-second, thirty-third, thirty-ninth and fortieth relays must be off. Energization and deenergization of the relays for the letter I is based on the code wiring shown in Fig. 9 of the drawing. It will be understood that this code wiring may be varied. The various relay tongues shown in Fig. 9 correspond to a single set of tongues, for example the tongues corresponding to the tongue 241 for the relay 51 in Fig. 5.

Figure 10:
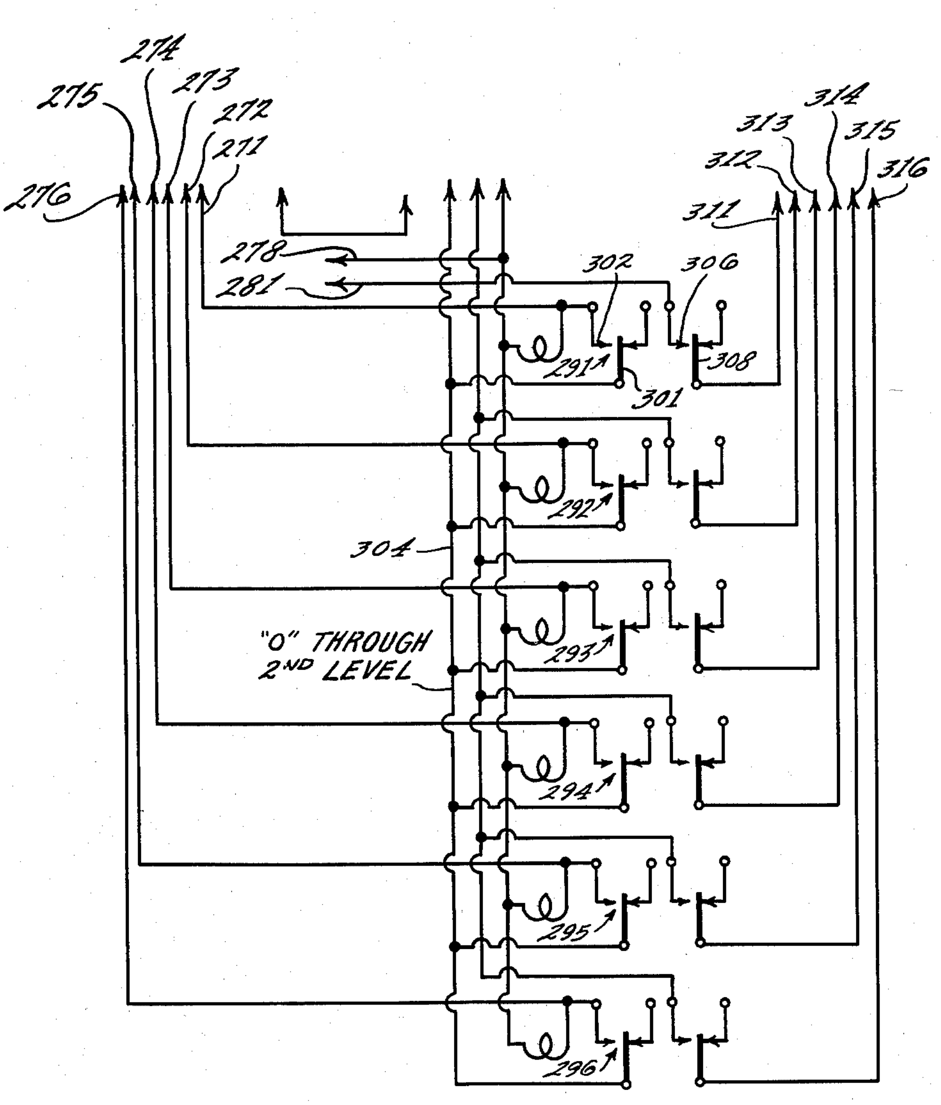
Fig. 10 is a schematic diagram of the syllable memory appearing in Fig. 2 of the drawing and taking the form of a set of syllable code relays.

Certain of the relay tongues of the relay A40, which is the fortieth relay of the set, are connected to terminals 271 to 276 which appear on Fig. 10 of the drawing. Fig. 13 shows an example of one connection. Each of the terminals 271 to 276 is connected to the operating coil of a relay in a group of six relays 291 to 296. The +B connection is forwarded by way of a conductor 278. The ground connection is forwarded by way of a conductor 281.

The group of six relays 291 to 296 are provided, as shown in Fig. 6, for the purpose of storing the sound or syllable which is set up upon operation of the set of forty relays shown in Figs. 6, 7 and 13 of the drawing. The code for each syllable is connected from a designated tongue of the relay A40 to one of the relays 291 to 296. When the syllable corresponding to a selected code for a sound or syllable is spoken into the microphone 14, the corresponding relay in the syllable memory 50 comprising the relays 291 to 296 will close and stay closed until it is released in a manner to be described hereinafter. Connections to the operating coils of these relays is made from the corresponding terminals 271 to 276. Assuming that the sound of the syllable or letter I is spoken into the microphone and that the code for I is connected through the tongues of the set of relays of Fig. 5, as indicated in Fig. 13, then the relay 291 will be operated by application of ground from the conductor 284 to an appropriate contact of one of the forty relays of Fig. 5 of the drawing. The terminal 271 is then grounded when the letter I is spoken into the microphone and the relay coil of the relay 291 is energized over the connection 278 to the positive terminal of the power source. When the relay is energized its tongue 301 and front contact 302 locks this relay by its connection to a conductor 304. This conductor 304 is grounded by the connection of the conductor 304 to the second level of the rotary switch 325. This ground connection is removed to unlock the relays connected to the conductor 304. The relays 291 to 296 are each provided with a grounded front contact and a tongue. In the foregoing and following, the term "back contact" of a relay is used to denote a normally closed contact which is opened when the relay is energized. The term "front contact" is used to denote a normally open contact which is closed when the relay is energized. The relay 291 is provided with a front contact 306 and a cooperating tongue 308. The contact 306 is connected to ground. The other five relays are similarly equipped. When any one of these relays is energized, ground is applied to a corresponding terminal of a set of terminals 311 to 316.

The arrangement and duplication of terminals, shown on the drawing, provides for ready connection of additional units in parallel with those shown and described in detail herein. Also, the distribution panel 350 shows, schematically, connection points for other units.

Fig. 11 of the drawing shows the letter decoder 351 appearing schematically in Fig. 2. The letter decoder 351 includes the previously mentioned stepper or sequence switch 325, which serves as a master letter decode switch, and a wiring matrix having twenty-six conductors for connection to the operating mechanism of a typewriter 280 and thirty conductors for connection to the contact bank of the rotary selector switch 325 in a manner to be described. The rotary switch 325 may be similar to the Automatic Electric Company Type Z–18750–1. Inasmuch as the stationary contact bank is duplicated the duplicate showing is omitted and it will be assumed that the switch has a single homing position and that the rotary wiper arms or contacts 401 return to this homing position after each complete stepping operation of the switch. The wiper arms 401 for the third to the eighth level of the switch are connected respectively to the previously mentioned terminals 311 to 316.

The wiper for the second level of the switch is connected to the conductor 304. This provides the locking connection to the conductor 304 of Fig. 10. The connection to conductor 321, previously mentioned (Fig. 9), applies a signal to start the stepper switch 325. This causes energization of the operating coil 521 of the stepper switch 325. The circuit for the coil is completed to the positive terminal of the power supply source. The stepper switch 325 moves from its homing position when the start signal arrives. When the stepper switch 325 moves from its homing position, ground applied to the conductor 406 at the contact 400 is interrupted which causes ground to be removed from the conductor 703. This releases the lamps and the relays in Fig. 5 so that a following spectral code may be set up in the bank of forty relays. The shunt condenser 743 provides for the delayed-or slow-release characteristic. As the stepper switch 325 progresses because of ground being applied to a conductor 526 and the mechanically controlled contacts 528 this stepper switch continues to operate until it again reaches the homing position in which application of ground to the conductor 526 is interrupted. When the stepper switch reaches the end of its travel and just before returning to the homing position, ground applied by way of the second level to the conductor 304 is interrupted thereby causing the relays 291 to 296 to be released. Immediately following this the stepper switch comes to its homing position and ground is restored to the conductor 406.

The conductors 311 to 316 are connected to the third to the eighth levels, respectively, of the rotary switch 325. These connections correspond to the connections to the syllable code relays 291 to 296 of Fig. 10. The first connected pair 530 of stationary contacts in the third level is connected to the conductor 551 of the wiring matrix. The first connected pair 533 of contacts in the fourth level is connected to the conductor 534 of the wiring matrix. The successive pairs of contacts following the contacts 530 in the third level, namely contacts 542 to 545, are connected respectively to the matrix conductors 552 to 555. This pattern of connections is carried out for the entire matrix. The described connections of the rotary switch 325 to the wiring matrix is such that five letters can be typed in sequence for one sweep of the contact wipers 401. The pattern of connections to the matrix conductors for the stationary contacts of the rotary switch in the illustrative example of Fig. 11 is such that successive contacts in the first level are connected to the first five "horizontal" conductors proceeding from the top of the figure.

For the assumed example of the sound for the letter I it may be assumed that the relay 291 in Fig. 10 is operated and that ground is applied to the wiper 401 for the third level of the rotary switch 325. It will be assumed further that the operating conductor 558 for I or "i" of the typewriter mechanism is connected to the conductor 551. Then as the rotary switch reaches the contact 530 for the conductor 551 it will cause the letter I to be typed. The contacts 542 to 545 will be connected to conductors in the matrix which are not connected to an operating solenoid for the typewriter.

The wiring matrix is provided with a set of twenty-six vertical conductors, including the conductor 558, designated by letters of the alphabet in Fig. 11 of the drawing. These twenty-six conductors are connected to the corresponding solenoids provided with armatures connected to the key levers of the typewriter. The general arrangement of Fig. 12 corresponds very generally to the location of the solenoids beneath the projecting key levers which extend out to the usual keys in a "standard" typewriter keyboard. It will be understood that this arrangement will be varied, depending on the type of recorder or typewriter that is employed.

The ninth and tenth levels of the rotary switch 325 are wired so that they may be employed to operate "slave" rotary switches which are similar in detail to the rotary switch 325. The wiper arm 401 of the ninth level is connected to a terminal 601. The wiper arm of the tenth level is connected to a terminal 602. These terminals are available for connection to the stepper and coil contacts and one of the levels of a "slave" rotary switch (not shown). One of these terminals 602 serves to actuate the slave rotary stepping switch step by step while the other terminal 601 provides connection to a homing circuit to insure synchronization.

Fig. 13 shows the code wiring for a selected sound or character. Referring to Fig. 13, a single set of contacts 244 for each of the forty relays is shown. These are preferably corresponding contacts for each relay. Fig. 13 indicates the manner in which the contact terminals and the terminal to the relay tongue are connected through the system of forty relays to provide a code such that a corresponding relay of Fig. 6 will be operated. The tongue and contacts of the first relay are labelled A1 to correspond with the showing of Fig. 5 and the tongue and contacts of the last relay of the set are labelled A40. In the schematic showing of Fig. 13 frequency is assumed to be plotted horizontally and time downwardly as viewed on Fig. 13. The connection 608 to the make, that is the normally open, contact of the third relay is to be connected, for the code shown, to the fifth contact in the first level of the rotary switch 40 in Fig. 5 of the drawing. The connection 610 on Fig. 13 will be connected to the relay 291 in Fig. 10 of the drawing. When this relay is energized and the rotary switch 325 of Fig. 11 operates, then the conductor leading from one stationary contact of the rotary switch 325 will energize the solenoid for the character I through the matrix connection.

While the mode of operation of the several units of the system of Fig. 2 have been pointed out above in connection with the more detailed descriptions accompanying the more detailed showing of these units, the operation will be reviewed for the spoken syllable or letter I (ai). When this sound is spoken into the microphone 14 the output of the microphone is amplified by the amplifier 66 and compressed as explained in detail above by the compressor-amplifier 20. The output of the compressor-amplifier 20 is applied through the high pass filter 22 to the amplifier 24.

The output from the amplifier 24 is applied to the nine channels 31 to 39 where the sound is separated into eight frequency bands. The frequency relationship of the eight frequency bands is indicated in Fig. 2 of the drawing. Fig. 1 of the drawing shows the typical frequency response characteristic of the vowel sound or syllable "ai" without regard to selected center frequencies of the different frequency bands obtained with the apparatus of Fig. 4. Fig. 1 also indicates time intervals of sampling for the construction of the curves of Fig. 1 assuming the usual rate of production of the sound. Where the intervals are not uniform, the system of this invention follows the rate of produtcion of the sound. In the illustrative example the intervals of sampling are provided by operation of the columns of relays of Fig. 6 as explained above with a resulting display of lights as indicated on the diagrammatic showing of the spectral display 56 of Fig. 2.

Information in accordance with the spectral display is stored in the forty relays of Fig. 5, the first of which, relay 51, and the last of which, relay 52, is shown in detail in Fig. 5 of the drawing. Coded wiring of the tongues and contacts of one chain or set of tongues and contacts operates one of the syllable code relays 291 to 296 of Fig. 6 of the drawing. Two examples of code wiring for the relay contacts of Fig. 5 are shown in Figs. 9 and 10 of the drawing.

Once a syllable code relay, for example the syllable code relay 291 of Fig. 10 is selected, ground is applied to one of the levels of the rotary switch 325 of Fig. 11. In the illustrative example ground is applied to the wiper arm for the third level of the rotary switch 325 when the syllable "ai" is spoken into the microphone 14. When the wiper arms of the switch 325 move in response to the signal appearing at the conductor 321, successive contacts of the relay 325 are scanned by the arms resulting in printing of the letter I. This is accomplished by the wiper arm applying a signal to the conductor 551 of the wiring matrix in Fig. 7 of the drawing.

If the syllable "are" is spoken into the microphone 14 the selected relay from the group of relays 291 to 296 will cause three successive wires of the matrix to be energized successively thereby to energize the solenoids for the three letters to spell out the word "are." This arrangement provides for a choice of spellings for words or syllables.

The switch 701 disconnects the holding bus and prevents the relays from holding. The switch 721 can be used to arrest the rotary stepper switch 42 on position 6. These switches may be employed in different ways for test and demonstration purposes.

What is claimed is:

1. Apparatus for analyzing an electrical signal representing sounds of speech comprising means for simultaneously determining the presence of a plurality of signals of different frequencies, means for determining changes in said plurality of signals, and means for repeating said determination under control of said change determining means.

2. Apparatus for analyzing the sound of a speech syllable comprising means for separating said sound into a plurality of sound components of different frequencies, means for determining the presence and relative strength of said components, and means for operating said last named means in response to a change in said sound components.

3. Apparatus for analyzing the sound of a speech syllable comprising means for separating said sound into a plurality of sound components of different frequencies, means for determining the presence and relative strength of said components at successive times, means for operating said last named means in response to a change in said sound components upon successive determinations, means for storing information at each determination, and means for displaying a visual indication of said stored information.

4. Apparatus for obtaining a control signal in response to an electrical signal representing sounds of speech comprising means for separating said electrical signal into a plurality of simultaneously occurring signals in different frequency bands, means for testing said frequency bands at a definite number of successive intervals to determine the presence or absence of signals in said different frequency bands, means for comparing said signals present or absent in said bands before and after each said interval for causing each next occurring test interval to terminate upon a change in said signals in said frequency bands, means for storing said signals resulting from the testing of said frequency bands, a coded circuit, and means for causing operation of said coded circuit in response to said stored signals to provide a control signal output.

5. Apparatus for operating a character printing device in response to an electrical signal representing sounds of speech comprising means for separating said electrical signal into a plurality of simultaneously occurring signals in different frequency bands, means for testing said frequency bands at a definite number of successive intervals to determine the presence or absence of signals in said different frequency bands, means for storing said signals resulting from the testing of said frequency bands, means for comparing the signals stored after each test interval and the signals resulting from the testing of said bands in the test interval next occurring and for causing the following test interval to occur upon a change in said stored signals and said resulting signals, a coded circuit, means for causing operation of said coded circuit in response to said stored signals, and means for causing the selection and printing of a character in response to operation of said coded circuit.

6. A system for storing printer operating signals developed in response to speech sounds comprising means for converting speech sounds to a voice frequency electrical signal, an amplifier for amplifying said signal, a compressor amplifier for compressing the amplitude range of said signal amplified by said amplifier, a plurality of signal channels, each channel being capable of passing a component signal in a predetermined frequency range, means for applying said amplified and compressed signal simultaneously to said plurality of signal channels, a sequence switch having a plurality of levels of successively arranged stationary contacts, a wiper arm for each level, means for causing each of said wiper arms successively to traverse the stationary contacts of its level, means operable in response to component signals in said signal channels for controlling said means for causing wiper arm traverse, means to connect each of said frequency selective signal channels to one of said wiper arms, a plurality of successively arranged relays, means to connect successive ones of said relays separately to the first stationary contact in each of said levels and means to connect further successive ones of said relays to further stationary contacts successively in like manner, each of said relays having at least one contact tongue and a normally open and normally closed stationary contact cooperating with said tongue, code wiring means interlinking said contact tongues and said cooperating stationary normally open and normally closed contacts of said plurality of relays, a set of storage relays, each of said relays of said additional set having a pair of normally open contacts, and a connection from said code wiring means to one relay of said set of storage relays.

7. A system for storing printer operating signals developed in response to speech sounds comprising means for converting speech sounds to a voice frequency electrical signal, an amplifier for amplifying said signal, a compressor amplifier for compressing the amplitude range of said signal amplified by said amplifier, a plurality of signal channels, each channel being capable of passing a component signal in a predetermined frequency range, means for applying said amplified and compressed signal simultaneously to said plurality of signal channels, a sequence switch having a plurality of levels of successively arranged stationary contacts, a wiper arm for each level, means for causing each of said wiper arms successively to traverse the stationary contacts of its level, means to connect each of said frequency selective signal channels to one of said wiper arms, a plurality of successively arranged relays, means to connect successive ones of said relays separately to the first stationary contact in each of said levels and means to connect further successive ones of said relays to further stationary contacts successively in like manner, each of said relays having at least one contact tongue and a normally open and normally closed stationary contact cooperating with said tongue, code wiring means interlinking said contact tongues and said cooperating stationary normally open and normally closed contacts of said plurality of relays, each of said relays having an additional contact tongue and a normally open and normally closed contact cooperating with said additional tongue, means connecting said additional tongues and associated contacts to control said means for causing wiper arm traverse, a set of storage relays, each of said relays of said additional set having a pair of normally open contacts, and a connection from said code wiring means to one relay of said set of storage relays.

8. The system of claim 7 wherein said means connecting said additional tongues and associated contacts comprises coincidence detecting circuits.

9. A system for operating a printer in response to speech sounds comprising means for converting speech sounds to a voice frequency electrical signal, an amplifier for amplifying said signal, a compressor amplifier for compressing the amplitude range of said signal amplified by said amplifier, a plurality of signal channels, each channel being capable of passing a component signal in a predetermined frequency range, means for applying said amplified and compressed signal simultaneously to said plurality of signal channels, a sequence switch having a plurality of levels of successively arranged stationary contacts, a wiper arm for each level, means for causing each of said wiper arms successively to traverse the stationary contacts of its level, means operable in response to component signals in said signal channels for controlling said means for causing wiper arm traverse, means to connect each of said frequency selective signal channels to one of said wiper arms, a plurality of successively arranged relays, means to connect successive ones of said relays separately to the first stationary contact in each of said levels and means to connect further successive ones of said relays to further stationary contacts successively in like manner, each of said relays having a plurality of contact tongues and a normally open and normally closed stationary contact cooperating with each of said tongues, a plurality of code wiring means, each of said code wiring means interlinking one of said contact tongues and said cooperating stationary normally open and normally closed contacts of said plurality of relays, an additional set of relays, each of said relays of said additional set having a pair of normally open contacts, a connection from each of said code wiring means to one relay of said additional set of relays, a second sequence switch having a plurality of levels of successively arranged stationary contacts, a wiper arm for each level of said second sequence switch, a connection from each of said normally open contacts of said additional set of relays to each of said wiper arms, a printer mechanism having a plurality of means for printing characters, a plurality of conductors arranged in side-by-side parallel relationship, one for each of said character printing means, a set of conductors arranged in side-by-side parallel relationship and separately connected to the first one of said successively arranged stationary contacts in all levels of said second-named sequencing switch, successive sets of conductors similarly arranged and connected to said remaining stationary contacts of said second sequence switch, said sets of conductors being disposed at right angles to each said first named plurality of conductors to permit interconnection of a predetermined conductor in said plurality of conductors with a predetermined conductor in one of said sets of conductors, and means for initiating stepping operation of said second-named sequence switch.

10. Apparatus for analyzing the sound of speech which comprises means for separating said sound into a plurality of components of different frequency, means for determining the presence and strength of said components at successive intervals, and means for comparing the results of two of said determinations of said components which follow each other after said successive intervals and for operating said determining means to provide the next successive determination when said two successive determinations differ.

11. In speech analysis apparatus, the combination comprising means for analyzing the sound of speech at successive intervals during the sounding of each syllable and for storing the results of the analysis, and means for comparing the results of a first and second of said analyses which follow each other after said successive intervals and for operating said analyzing means to perform a third of said successive analyses after an interval terminating when a change takes place between the results of said second analysis and the results of said first analysis.

12. Speech analysis apparatus which comprises means for separating the sound of speech into a plurality of components of said sound of different frequencies, means for determining which of said components are of greater than a certain amplitude and storing information as to said determination at successive intervals during the sounding of each syllable of said speech, and means for establishing the duration of each of said successive intervals including means for successively comparing said information stored after termination of each of said successive intervals with other information as to the components of greater than said certain amplitude occurring immediately thereafter and for operating said determining means to initiate the next successive storage of information when changes occur in which of said first mentioned information and in said other information.

13. Speech analysis apparatus which comprises means for separating the sound of speech into a plurality of components of said sound of different frequencies, means for determining which of said components are of greater than a certain amplitude and storing information as to said determination at successive intervals during the sounding of each syllable of said speech, and means for establishing the duration of each of said successive intervals including means responsive to said stored information for detecting when changes in the ones of said components of greater than said certain amplitude take place after each of said successive time intervals, and means for repeatedly operating said determining means upon occurrence of said changes.

References Cited in the file of this patent

UNITED STATES PATENTS

| | | |
|---|---|---|
| 2,238,555 | Dudley | Apr. 5, 1941 |
| 2,575,909 | Davis et al. | Nov. 20, 1951 |
| 2,575,910 | Mathes | Nov. 20, 1951 |
| 2,646,465 | Davis et al. | July 21, 1953 |
| 2,685,615 | Biddulph et al. | Aug. 3, 1954 |